Dec. 27, 1960     E. H. LAND     2,966,408

PHOTOGRAPHIC FILMS

Filed March 14, 1957

INVENTOR.
Edwin H. Land
BY Brown and Mikulka
and
Stanley H. Mervis
ATTORNEYS

United States Patent Office 2,966,408
Patented Dec. 27, 1960

2,966,408
PHOTOGRAPHIC FILMS

Edwin H. Land, Cambridge, Mass., assignor to Polaroid Corporation, Cambridge, Mass., a corporation of Delaware Filed Mar. 14, 1957, Ser. No. 646,035

2 Claims. (Cl. 96—29)

This invention relates to photography and, more particularly, to photographic films containing light filters.

One object of this invention is to provide a photographic film containing a light filter, whereby the use of a light filter before the lens may be eliminated.

A further object of this invention is to provide a photographic film containing a light filter, wherein no adjustment in exposure is required when used by the photographer.

Another object of this invention is to provide a method of controlling the effective speed of a photographic film.

A further object of this invention is to provide a photographic film suitable for use in diffusion-transfer reversal processes, said film containing a light filter which does not interfere with, and is unaffected by, normal processing of such film.

Another object of this invention is to provide photographic light filters in the form of pigments incorporated in the photographic product.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawing wherein.

This invention relates generally to composite photographic products of the type employed in diffusion-transfer reversal processes. In particular, it relates to a composite photographic product of the type which comprises an image-carrying or image-receiving layer or material, a container releasably confining a liquid, and a photosensitive layer. The liquid, when spread between predetermined, corresponding areas of said layers, accomplishes a predetermined processing of an exposed area of the photosensitive layer. This processing preferably comprises the concurrent development of a latent negative image in the photosensitive layer and the formation of a positive image on the image-receiving material. U.S. Letters Patent No. 2,543,181, issued February 27, 1951 and No. 2,579,587, issued December 25, 1951, both in the name of Edwin H. Land, describe composite photographic products of this type and suitable camera apparatus for exposing and processing such composite photographic products.

When using composite photographic products of the type described, it has heretofore frequently been desirable, for various reasons, to employ photographic light filters before the lens when exposing the photosensitive layer. Such filters normally require increased exposures to compensate for the light loss due to absorption by the filter. In addition, such filters are subject to the hazards of breakage, fingerprints, etc.

U.S. Patent No. 1,972,424, issued September 4, 1934 to H. Mediger discloses the use of a separate, readily separable, colored transparent sheet with a conventional roll film to act as a light filter. The colored sheet is removed prior to developing. A colored sheet of the type therein suggested would not be suitable for use in diffusion-transfer reversal processes of the type herein described, as it would interfere with the normal processing operations.

It has also been proposed to apply a dye over the emulsion to function as a photographic filter. Experience has shown that such dyes have a tendency to adversely affect the emulsion. Furthermore, these dyes wash out or are decomposed in the processing solutions. Thus, it is not practical to use such dyes in the composite film products employed in diffusion-transfer reversal photography.

It has now been found that these difficulties may be avoided by incorporating a suitable filter element within the photographic product, as will be further described herein.

Figure 1:
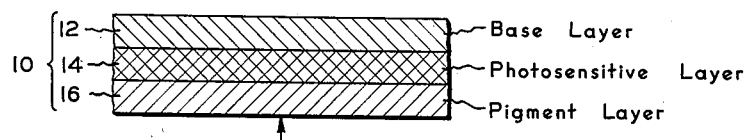
Figure 1 is an enlarged, sectional and diagrammatic view of a photographic film representing one embodiment of the present invention.
Figure 2:
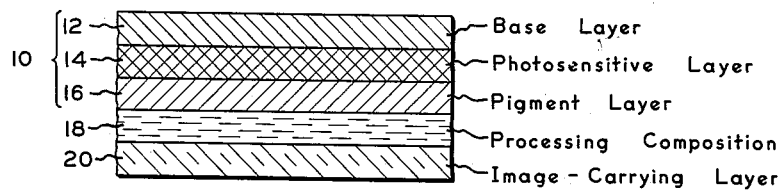
Fig. 2 is an enlarged, sectional and diagrammatic view of the processing of a photographic film similar to that depicted in Fig. 1.

Referring to the drawings, and particularly to Fig. 1, there is illustrated one embodiment of this invention. A photosensitive element 10 comprises a base or support layer or stratum 12 adapted to carry on one surface thereof a photosensitive layer or stratum 14, which, in turn, carries a pigment layer or stratum 16 which is capable of functioning as a light filter. This pigment layer 16 is an integral part of the photosensitive element 10 and remains therein when the image-receiving layer is separated from the photosensitive element at the end of the imbibition period. In use, the photosensitive layer is exposed to actinic light through the pigment layer 16, as indicated by the arrow in Fig. 1. In a preferred embodiment, referring to Fig. 2, the exposed photosensitive element 10 is brought into superposed relationship with an image-receiving layer or stratum 20, as a layer or stratum 18 of a liquid processing composition is uniformly spread between said photosensitive element 10 and said image-receiving layer 20. The positive image is revealed by stripping the image-receiving layer 20 from the photosensitive element 10 after a suitable, predetermined imbibition period, for example, one minute.

The base layer 12 may comprise a support of paper, such as baryta paper, or it may be a transparent film base, such as a cellulosic ester or a cellulose mixed ester. The photosensitive layer 14 may be a photosensitive silver halide emulsion, and preferably a high speed panchromatic emulsion, e.g., Eastman Kodak Super XX Pan.

The filter layer 16 comprises a pigment which:

(1) is not transferable to the image-receiving layer;

(2) does not react deleteriously with the silver halide developer, oxidation products thereof, or other components of the liquid processing composition, and is substantially photographically inert;

(3) does not chemically affect the emulsion, and thus does not desensitize the emulsion;

(4) will allow reagents to permeate through the layer of pigment; and (5) is sufficiently transparent or is capable of being made sufficiently transparent to function as an effective filter.

The term "pigment" as used herein is intended to be inclusive of both organic and inorganic substances which are nondiffusible to the image-receiving element. Thus, it is also contemplated to employ nontransferable metal salts or lakes of dyes, as well as dyes which are nondiffusible due to their substantivity, to the emulsion medium, e.g., gelatin.

The filter layer of pigment may be applied by casting from a dispersion or suspension of the pigment in a suitable medium.

One excellent pigment for this purpose is a pigment comprising a suspension of a benzidine yellow and commercially available as an "Aridye pigment color" under the name of "Padding Yellow GL" from Textile Colors Division, Interchemical Corporation, Hawthorne, New Jersey. "Padding Yellow GL" is substantially insoluble in alkaline solutions and efficiently transmits green and red light while absorbing blue light. Pigment filter layers prepared using "Padding Yellow GL" give results comparable to those obtained using a Wratten Yellow K2 filter before the lens. This pigment may be employed in the commercially available form of a water-miscible paste, or this paste may be suitably diluted with water, or with water and gelatin. An example of a suitable pigment composition is:

Example 1

| | |
|---|---|
| "Padding Yellow GL" | 1 part |
| Water | 7 parts |

Figure 4:
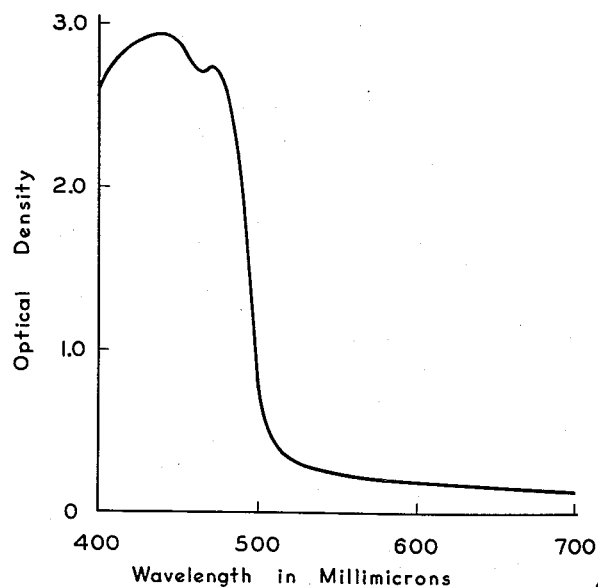
Fig. 4 is the absorption curve of a photographic light filter layer in accordance with this invention.

A coating of this pigment composition is applied to give a pigment layer having an approximate thickness of from 0.0001 to 0.0003 inch. The light-filtering efficiency of this pigment filter layer is shown by the absorption curve reproduced in Fig. 4 of a pigment layer cast on a cellulose acetate film base.

As further examples of suitable pigments, mention may be made of "Padding Orange," "Padding Yellow N," "Aquaprint Yellow G" and "Aquaprint Yellow GL," all commercially available from the Interchemical Corporation; "Calcotex Yellow G" available from the Calco Chemical Division, American Cyanamid Co., Bound Brook, New Jersey; the pigments prepared by condensing Blue B Salt with benzoylacetonitroanilide or acetaceto-2-chloroanilide; and the pigment prepared by condensing Scarlet 2G Fast Salt with 1-phenyl-3-methyl-5-pyrazolone.

The liquid processing composition is contained in a collapsible container, which is adapted to be fractured and the liquid processing composition released along one edge of the container upon increase of hydraulic pressure in the container. These containers are preferably formed of a sheet of oxygen- and water vapor-impervious material folded along a medial line, sealed at the ends and at the edge opposite the fold, the edge seal being preferably weaker than the end seals.

The liquid processing composition preferably comprises a water solution of a silver halide developing agent, an alkali for imparting to the solution a sufficiently high alkalinity to permit the developing agent to carry out its developing function, a substance, i.e., a silver halide solvent, for forming a soluble complex with silver halide, and a film-forming material. The film-forming material, which is preferably a high molecular weight polymer, imparts to the composition a predetermined high viscosity and retains its viscosity-imparting and film-forming properties in an aqueous alkaline solution.

Suitable liquid processing compositions have been described in the previously mentioned U.S. Patents Nos. 2,543,181 and 2,579,587, as well as in U.S. Patent No. 2,647,056, issued to Edwin H. Land on July 28, 1953. By way of illustration, one such liquid processing composition, as set forth in Example 3 of said Patent No. 2,647,056, comprises:

| | | |
|---|---|---|
| Water | cc | 1000 |
| Sodium sulfite | g | 70 |
| Hydroquinone | g | 33 |
| Sodium thiosulfate | g | 14 |
| Sodium carboxymethyl cellulose (20% aqueous solution) | cc | 20 |
| Sodium hydroxide (10% solution) | cc | 112 |

The image-receiving layer 20 is preferably a baryta paper; it may be formed of such other material as, for example, regenerated cellulose, polyvinyl alcohol or other materials as set forth in the cited patents. In certain instances, it is contemplated that the layer of liquid processing composition may itself serve as the image-receiving material.

It is further contemplated that the pigment comprising the light filtering agent may be dispersed in the emulsion layer, instead of being in a separate layer. Where the liquid processing composition is adapted to be spread between the photosensitive element and an image-receiving or spreading element prior to exposure, it is also contemplated that the pigment may be dispersed in the liquid processing composition. In this latter embodiment, the layer of liquid processing composition should adhere to and remain with the photosensitive element when that element is stripped apart from the image-receiving element.

Figure 3:
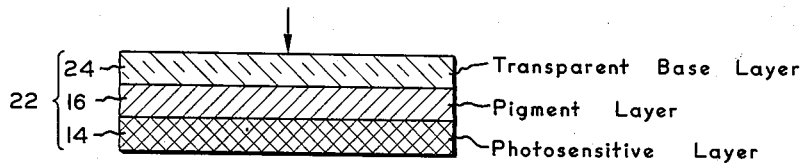
Fig. 3 is an enlarged, sectional and diagrammatic view, similar to Fig. 1, of another embodiment of the present invention.

Fig. 3 illustrates a further embodiment wherein a photosensitive layer 14 is exposed through a transparent base 24, as indicated by the arrow. Photographic film products of this type are described in U.S. Patent No. 2,653,872 issued to Edwin H. Land on September 29, 1953. In this embodiment, the pigment layer 16 is disposed between the transparent base 24 and the photosensitive layer 14. In a further modification, the pigment may be dispersed in the material forming the transparent base 24, thus eliminating the need for a separate pigment layer 16. In a further embodiment of this invention, it has been found that small concentrations of the desired pigment may be effectively used as filters without significant loss of film speed.

It has been found that use of a pigment filter layer in accordance with this invention may give rise to an effective increase in film speed, as compared with a conventional before-the-lens filter. This is illustrated by the following, nonlimiting example.

Example 2

A pigment composition comprising:

| | |
|---|---|
| "Padding Orange" | 1 part |
| Water | 20 parts | is applied over a panchromatic emulsion. The resulting photosensitive element is exposed and processed in a Polaroid Land Camera, Model 95A (Polaroid Corporation, Cambridge, Massachusetts). Using a shutter setting of 8 as a control, the thus-prepared photosensitive element at a shutter setting of 7 gives results comparable to that obtained with the same emulsion and a Wratten Orange filter (4X exposure factor) before the lens at a shutter setting of 6. It will thus be seen that use of a pigment filter layer has given equal results but with less film speed loss.

While this invention has been illustrated by reference to orange or yellow pigment filters, it is to be understood that pigments of other colors and having the properties described above may be satisfactorily employed. Thus, one may use an appropriate red pigment with an emulsion sensitive to infrared radiation. In addition to the yellow and orange pigments, appropriate green or red pigments also may be used with panchromatic emulsions, depending upon the desired filter effect.

One problem in diffusion-transfer reversal processes is that emulsions having certain desired properties may have film speeds which are too high for ordinary amateur use. The pigment filter layers of this invention may be employed to reduce the effective film speed to a useful level, whereby the advantages of a filter may be obtained without sacrificing desired properties of the emulsion.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A diffusion transfer reversal process for obtaining a positive transfer image in silver which comprises the steps of exposing a photosensitive element comprising a plurality of layers, at least one of said layers comprising a support, at least one of said layers comprising a photosensitive silver halide emulsion, and at least one of said layers comprising an outermost, colored, alkali-permeable, transparent layer containing a substantially uniform concentration of pigment dispersed therein, said transparent layer being so positioned as to act as a photographic light filter during exposure of said silver halide emulsion by light transmitted through said layer to thereby effect a substantially uniform filtration of the incident light within a predetermined portion of the spectrum; developing said exposed silver halide emulsion in the presence of a silver halide solvent; reacting unreduced and undeveloped silver halide in said emulsion with said silver halide solvent to form an imagewise distrubution of soluble silver complex; transferring, by imbibition, through said transparent layer, at least part of said imagewise distribution to an image-receiving material contiguous with said transparent layer; precipitating said soluble silver complex to silver to provide a positive image in said image-receiving material; separating said image-receiving material from its contiguous relationship with said transparent layer, subsequent to image formation; said development, transfer and image formation being effected to the substantial exclusion of any transfer and reaction of said pigment.

2. A process as defined in claim 1, wherein said yellow pigment is a benzidine yellow pigment.

References Cited in the file of this patent

UNITED STATES PATENTS

| | | |
|---|---|---|
| 2,368,647 | Dreyfuss | Feb. 6, 1945 |
| 2,534,654 | Barnes | Dec. 19, 1950 |
| 2,614,926 | Land | Oct. 21, 1952 |
| 2,694,008 | Berger et al. | Nov. 9, 1954 |
| 2,719,088 | Herz et al. | Sept. 27, 1955 |
| 2,774,668 | Rogers | Dec. 18, 1956 |

FOREIGN PATENTS

| | | |
|---|---|---|
| 746,948 | Great Britain | Mar. 21, 1956 |

UNITED STATES PATENT OFFICE
CERTIFICATION OF CORRECTION

Patent No. 2,966,408 December 27, 1960

Edwin H. Land

It is hereby certified that error appears in the above numbered patent requiring correction and that the said Letters Patent should read as corrected below.

Column 4, line 12, for "material" read -- materials --; column 6, line 3, for "distrubution" read -- distribution --; lines 15 and 16, strike out "yellow".

Signed and sealed this 20th day of June 1961.

(SEAL)
Attest:

ERNEST W. SWIDER
Attesting Officer

DAVID L. LADD
Commissioner of Patents